United States Patent
Gimat et al.

(10) Patent No.: US 11,105,210 B2
(45) Date of Patent: Aug. 31, 2021

(54) BLADE COMPRISING A LEADING EDGE SHIELD AND METHOD FOR PRODUCING THE BLADE

(71) Applicant: SAFRAN AIRCRAFT ENGINES, Paris (FR)

(72) Inventors: Matthieu Arnaud Gimat, Moissy-Cramayel (FR); Jérémy Guivarc'h, Moissy-Cramayel (FR); Gilles Pierre-Marie Notarianni, Moissy-Cramayel (FR); Frédéric Jean-Bernard Pouzadoux, Moissy-Cramayel (FR); Thibault Ruf, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 87 days.

(21) Appl. No.: 15/763,404

(22) PCT Filed: Sep. 27, 2016

(86) PCT No.: PCT/FR2016/052444
§ 371 (c)(1),
(2) Date: Mar. 26, 2018

(87) PCT Pub. No.: WO2017/055727
PCT Pub. Date: Apr. 6, 2017

(65) Prior Publication Data
US 2018/0274374 A1    Sep. 27, 2018

(30) Foreign Application Priority Data
Sep. 28, 2015 (FR) ...................................... 1559132

(51) Int. Cl.
*F01D 5/28* (2006.01)
*F04D 29/32* (2006.01)
*F01D 5/14* (2006.01)

(52) U.S. Cl.
CPC ............. *F01D 5/282* (2013.01); *F01D 5/147* (2013.01); *F04D 29/324* (2013.01);
(Continued)

(58) Field of Classification Search
CPC . F01D 5/147; F01D 5/28; F01D 5/282; F01D 5/286; F01D 5/288; F04D 29/324;
(Continued)

(56) References Cited

U.S. PATENT DOCUMENTS 1,250,681 A * 12/1917 Sheldon ............... A47J 43/0711
                                                           416/227 R
1,860,557 A *  5/1932 Sukohl .................. B64C 11/205
                                                           416/224
(Continued)

FOREIGN PATENT DOCUMENTS

DE    2644083 A1    4/1977
EP    2703605 A2    3/2014
(Continued)

OTHER PUBLICATIONS

International Search Report and Written Opinion with English translation dated Jan. 24, 2017, in corresponding International Application No. PCT/FR2016/052444 (13 pages).

*Primary Examiner* — David Hamaoui
*Assistant Examiner* — Wayne A Lambert
(74) *Attorney, Agent, or Firm* — Bookoff McAndrews, PLLC (57) ABSTRACT

The invention provides a blade (16) comprising a blade body (30) made of organic matrix composite material reinforced by fibers and a leading edge shield (32) made of a material
(Continued)

that withstands point impacts better than the composite material of the blade body. The leading edge shield (32) is assembled on the blade body (30) and the blade (16) includes bonding reinforcement (46) adhesively bonded on the leading edge shield (32) and on the blade body (16). The invention also provides a turbojet including a fan including such blades, and also a method of fabricating such a blade.

19 Claims, 4 Drawing Sheets

(52) U.S. Cl.
CPC ...... *F05D 2220/36* (2013.01); *F05D 2230/23* (2013.01); *F05D 2240/303* (2013.01); *F05D 2300/133* (2013.01); *F05D 2300/603* (2013.01); *Y02T 50/60* (2013.01)

(58) Field of Classification Search
CPC ................. Y02T 50/673; Y02T 50/672; F05D 2300/603; F05D 2300/601; F05D 2300/6012; F05D 2300/133; F05D 2220/36; F05D 2240/303; F05D 2240/304; F05D 2240/307; F05D 2230/23
See application file for complete search history.

(56) References Cited

U.S. PATENT DOCUMENTS

| | | | | | |
|---|---|---|---|---|---|
| 2,884,077 | A | * | 4/1959 | Stamm | B64C 27/473 416/226 |
| 3,758,234 | A | * | 9/1973 | Goodwin | F01D 5/282 416/230 |
| 3,762,835 | A | * | 10/1973 | Carlson | B29C 70/04 416/224 |
| 3,892,612 | A | * | 7/1975 | Carlson | F01D 5/282 156/150 |
| 4,010,530 | A | * | 3/1977 | Delgrosso | F04D 29/324 29/889.71 |
| 4,118,147 | A | * | 10/1978 | Ellis | F01D 5/16 416/230 |
| 4,639,284 | A | * | 1/1987 | Mouille | B29D 99/0025 156/213 |
| 4,667,906 | A | * | 5/1987 | Suarez et al. | B64C 3/28 244/117 A |
| 4,738,594 | A | * | 4/1988 | Sato | F04D 29/388 416/213 A |
| 4,795,313 | A | * | 1/1989 | Coulon | F01D 5/28 416/224 |
| 4,856,162 | A | * | 8/1989 | Graff | B23K 20/02 29/889.6 |
| 4,895,491 | A | * | 1/1990 | Cross | F04D 29/388 244/123.9 |
| 5,165,859 | A | * | 11/1992 | Monroe | F04D 29/289 416/224 |
| 5,314,282 | A | * | 5/1994 | Murphy | B29C 66/21 411/426 |
| 5,392,514 | A | | 2/1995 | Cook et al. | |
| 5,486,096 | A | * | 1/1996 | Hertel | B64C 27/46 156/313 |
| 5,672,417 | A | * | 9/1997 | Champenois | F01D 5/282 442/208 |
| 5,725,354 | A | * | 3/1998 | Wadia | F01D 5/147 416/224 |
| 5,785,498 | A | * | 7/1998 | Quinn | F01D 5/14 416/224 |
| 5,876,651 | A | * | 3/1999 | Blackburn, Jr. | B32B 15/08 264/265 |
| 5,887,332 | A | * | 3/1999 | Champenois | B29C 37/0082 264/258 |
| 5,931,641 | A | * | 8/1999 | Finn | F01D 5/147 416/229 A |
| 6,431,837 | B1 | * | 8/2002 | Velicki | F04D 29/388 416/223 R |
| 7,600,978 | B2 | * | 10/2009 | Vance | F01D 5/147 416/230 |
| 7,780,410 | B2 | * | 8/2010 | Kray | B23P 15/04 415/9 |
| 7,789,630 | B2 | * | 9/2010 | Schilling | B64C 11/205 416/224 |
| 7,841,834 | B1 | | 11/2010 | Ryzhic | |
| 8,061,997 | B2 | * | 11/2011 | Le Hong | F01D 5/147 416/205 |
| 8,241,003 | B2 | * | 8/2012 | Roberge | F01D 5/147 416/229 A |
| 8,251,664 | B2 | * | 8/2012 | Schreiber | F01D 5/282 416/191 |
| 8,657,581 | B2 | * | 2/2014 | Pilpel | F01D 5/282 416/226 |
| 8,807,931 | B2 | * | 8/2014 | Roberts | F01D 5/282 415/200 |
| 9,322,283 | B2 | * | 4/2016 | Parkin | F04D 29/324 |
| 9,745,851 | B2 | * | 8/2017 | Li | F01D 5/3007 |
| 10,207,283 | B2 | * | 2/2019 | Miki | F01D 5/28 |
| 10,267,165 | B2 | * | 4/2019 | Zafiris | F04D 29/023 |
| 2003/0129061 | A1 | * | 7/2003 | Finn | B23P 15/04 416/224 |
| 2004/0184921 | A1 | * | 9/2004 | Schreiber | B23P 15/04 416/229 R |
| 2005/0053466 | A1 | * | 3/2005 | Finn | F01D 5/147 416/230 |
| 2005/0158171 | A1 | * | 7/2005 | Carper | B32B 18/00 415/200 |
| 2005/0278950 | A1 | * | 12/2005 | Despreaux | B21D 53/78 29/889.71 |
| 2007/0041842 | A1 | * | 2/2007 | Thompson | F01D 5/147 416/223 R |
| 2008/0075601 | A1 | * | 3/2008 | Giusti | F01D 5/147 416/229 A |
| 2009/0053070 | A1 | * | 2/2009 | Schilling | F01D 5/147 416/93 R |
| 2009/0165299 | A1 | * | 7/2009 | Cammer | F01D 5/147 29/889.7 |
| 2010/0014982 | A1 | * | 1/2010 | Haje | F01D 5/282 416/241 R |
| 2010/0028160 | A1 | * | 2/2010 | Schaeffer | F01D 5/005 416/224 |
| 2010/0232974 | A1 | | 9/2010 | DeMoura et al. | |
| 2011/0038732 | A1 | * | 2/2011 | Huth | B29C 70/24 416/229 A |
| 2011/0194941 | A1 | * | 8/2011 | Parkin | B29C 70/48 416/224 |
| 2012/0171044 | A1 | * | 7/2012 | Berard | F01D 5/282 416/241 A |
| 2013/0004323 | A1 | * | 1/2013 | Hansen | B23P 9/04 416/224 |
| 2013/0186507 | A1 | * | 7/2013 | Godon | B64C 11/26 139/425 R |
| 2014/0030106 | A1 | * | 1/2014 | Schreiber | F04D 29/324 416/241 A |
| 2014/0064964 | A1 | * | 3/2014 | Care | F01D 5/20 416/2 |
| 2014/0093367 | A1 | * | 4/2014 | Parkin | F01D 5/28 415/208.1 |
| 2014/0193271 | A1 | * | 7/2014 | Dudon | B23P 15/04 416/241 R |
| 2015/0354375 | A1 | * | 12/2015 | McComb | F01D 5/147 60/805 |
| 2016/0032741 | A1 | * | 2/2016 | Perez-Duarte | F01D 9/02 415/208.1 |
| 2016/0108741 | A1 | * | 4/2016 | Jevons | F01D 5/147 416/230 |
| 2016/0312616 | A1 | * | 10/2016 | Notarianni | B29C 70/48 |

(56) References Cited

U.S. PATENT DOCUMENTS

2017/0282466 A1* 10/2017 Backhouse ........... B29C 70/382
2017/0341732 A1* 11/2017 Schneider ............... F01D 5/286

FOREIGN PATENT DOCUMENTS

| | | | | |
|---|---|---|---|---|
| EP | 3098438 A1 | * | 11/2016 | ............... F03D 9/25 |
| ES | 2333929 A1 | * | 3/2010 | |
| GB | 548338 A | * | 10/1942 | ........... B64C 11/205 |
| GB | 2218473 A | * | 11/1989 | ............. B64D 45/02 |
| WO | WO 2012/001279 A1 | | 1/2012 | |
| WO | WO 2015/047756 A1 | | 4/2015 | |

* cited by examiner

BLADE COMPRISING A LEADING EDGE SHIELD AND METHOD FOR PRODUCING THE BLADE

CROSS-REFERENCE TO RELATED APPLICATIONS

This application is the U.S. national phase entry under 35 U.S.C. § 371 of International Application No. PCT/FR2016/052444, filed on Sep. 27, 2016, which claims priority to French Patent Application No. 1559132, filed on Sep. 28, 2015, the entireties of each of which are herein incorporated by reference.

BACKGROUND OF THE INVENTION

The present invention relates to a blade made of composite material including a leading edge shield. Such leading edge shields are typically used for protecting the leading edges of rotary blades or of guide vanes against impacts and erosion. The term "blades" is used in this context to cover both fan blades and aircraft propeller blades. In order to limit their weight, such blades are typically made of organic matrix composite material, e.g. fiber-reinforced polymer material. Although such materials present mechanical qualities that are generally very favorable, in particular relative to their weight, they present a degree of sensitivity to point impacts. Shields, typically made of very strong metal material, such as titanium alloys, are thus normally installed on the leading edges of such blades, in order to protect them against impacts. These impacts may be the consequence of the engine ingesting large birds, such as ducks, or small birds, such as sparrows, for example. Such shields normally take the form of a fine pressure-side fin and a fine suction-side fin that are joined together by a thicker section placed astride the leading edge, the shield fitting closely to the shape of the blade on the leading edge and on its adjacent pressure- and suction-side sections. The pressure-side and suction-side fins extend respectively over these pressure-side and suction-side sections of the blade, and they serve mainly to position and fasten the shield on the leading edge.

In order to improve the aerodynamic performance of blades, their leading edges are being given shapes that are ever more complex, thereby making it more complicated both to fabricate shields that need to fit those shapes closely and also to secure them on blades.

Furthermore, in the event of impacts against a blade, the shield may become at least partially loosened from the leading edge of the blade made of composite material, thereby giving rise to a reduction in the aerodynamic performance of the blade associated with degrading its airflow behavior, accompanied by an unbalance in the event of part of the shield being lost. Furthermore, if a portion of the shield is torn off, the leading edge of the blade is no longer protected over its entire height, and the composite material that has been laid bare at the leading edge of the blade is subjected to attack from the external environment. The resulting profile is generally irregular, thereby also degrading its airflow behavior. It is then necessary to repair the blade and/or to replace it.

OBJECT AND SUMMARY OF THE INVENTION

The present invention seeks to remedy these drawbacks at least in part.

To this end, the invention provides a blade comprising a blade body made of organic matrix composite material reinforced by fibers and a leading edge shield made of a material that withstands point impacts better than the composite material of the blade body, the leading edge shield being assembled on the blade body, the blade including bonding reinforcement adhesively bonded on the leading edge shield and on the blade body.

During impacts against the leading edge shield, the presence of the bonding reinforcement serves to reduce the risk of the shield separating, in particular close to the free edges of the leading edge shield. Specifically, since the bonding reinforcement is bonded both on the leading edge shield and on the blade body, at least a portion of the free edge of the leading edge shield is covered by the bonding reinforcement, such that the force required to separate the leading edge shield from the blade body is greater. Thus, the risks of damaging the blade are reduced. Thus, by way of example, the leading edge shield stands up very well to ingesting large birds in the engine, while possibly separating locally from the blade body, and it remains intact when ingesting small birds, without separating, not even locally, in particular thanks to the bonding reinforcement. Where necessary, the bonding reinforcement may be replaced during a repair more easily than totally replacing the shield.

Furthermore, in the event of an impact, if the bonding reinforcement is damaged, it can be replaced without it being necessary to replace the leading edge shield and/or the blade.

The blade body that is made of organic matrix composite material reinforced by fibers may include a 3D-woven fabric.

It can be understood that in this embodiment, the blade body has fibers that are woven in the three dimensions of three-dimensional space. Thus, the blade body is not made by stacking a plurality of two-dimensional (2D) layers of fiber-reinforced composite matrix material. A 3D woven blade body is less subject to fraying than is a 2D woven blade body. Thus, when a point impact occurs against such a 3D blade body, the risk of the leading edge shield separating from the blade body is increased. The presence of the bonding reinforcement adhesively bonded on the leading edge shield and on the blade body is very advantageous.

The blade has a leading edge and a trailing edge, and the leading edge shield has a free edge, the bonding reinforcement including a zone covering the leading edge shield and a zone covering the blade body, the zone covering the leading edge shield possibly having a width, as measured perpendicularly to the free edge, that lies in the range 0.5 centimeters (cm) to 1.5 cm, and preferably in the range 0.8 cm to 1.2 cm, more preferably equal to about 1 cm.

The blade has a blade tip and a blade root and a total height, the bonding reinforcement possibly being adhesively bonded in the proximity of the blade tip, over a range extending from 0.6 of the total height of the blade, preferably 0.7 of the total height of the blade, as measured from the blade root, to the total height of the blade, preferably to 0.95 of the total height of the blade, more preferably to 0.9 of the total height of the blade.

The leading edge shield may be made of titanium-based alloy.

This material presents very good ability to withstand point impacts.

The term "titanium-based alloy" is used to designate alloys in which the majority of the content by weight is titanium. It can thus be understood that titanium is the element in the alloy having the greatest content by weight. By way of example, the titanium-based alloy may have a content by weight of at least 50% titanium, preferably at least 70% titanium, more preferably at least 80% titanium.

The leading edge shield may equally well be made of steel or of a metal alloy commonly known by the registered trademark Inconel™. The term "Inconel" is used below to designate an alloy based on iron alloyed with nickel and chromium.

The bonding reinforcement may have fibers that are preferably oriented perpendicularly to the free edge of the leading edge shield.

The fibers are oriented parallel to the main forces to which the free edges of the leading edge shields are subjected during separation, thereby maximizing the reinforcing effect of the bonding reinforcement. Bonding reinforcement of this type is of low cost and readily available. It can also be easily positioned and bonded on the blade.

The bonding reinforcement may comprise unidirectional fibers, woven fibers, and/or nonwoven fibers that are distributed uniformly. By way of example, the fibers may be glass fibers or carbon fibers.

The bonding reinforcement may comprise a stack of fiber layers, each layer of comprising fibers of a composition different from the other layers, and each layer possibly having fibers at an orientation that is different from the other layers.

The composition of the bonding reinforcement need not be uniform over its entire surface area.

It can thus be understood that although the fibers may have different orientations, the orientation of the fibers is for the most part perpendicular to a free edge of the leading edge shield.

The blade includes a blade tip and a blade root, the leading edge shield may include a projecting portion and a recessed portion, the recessed portion being arranged between the blade tip and the projecting portion and the bonding reinforcement may be adhesively bonded on the recessed portion.

The recessed portion of the blade is located closer to the blade tip than is the projecting portion. It has been found that separation of the leading edge shield generally takes place in the recessed portion of the leading edge shield, at the blade tip.

The blade may have a suction side, a pressure side, and at least two bonding reinforcements, a first bonding reinforcement being adhesively bonded on the pressure side, and a second bonding reinforcement being adhesively bonded on the suction side.

This reinforces the free edges on the pressure side and on the suction side of the blade.

Furthermore, particularly when the blade has a plurality of bonding reinforcements, each bonding reinforcement may be of a shape that is different from the other bonding reinforcement, and/or may comprise fibers of a composition and an orientation that are different from the other bonding reinforcement, and/or may be formed by one or more stacked fiber layers, which layers may comprise fibers of compositions that are different from the other layers, and each layer may have fibers oriented differently from the other layers.

The blade may have a suction side and a pressure side, and wherein the bonding reinforcement comprises a first portion adhesively bonded on the pressure side and a second portion adhesively bonded on the suction side, the first portion and the second portion being connected together by an intermediate portion.

A single bonding reinforcement is bonded on the blade to cover both of the free edges of the leading edge shield, on the pressure side and on the suction side.

The intermediate portion may be adhesively bonded on the leading edge shield.

The intermediate portion may be adhesively bonded on a trailing edge of the blade.

The intermediate portion may be adhesively bonded on the blade tip.

The invention also provides both a turbojet including a fan having a plurality of blades as defined above, and also a method of fabricating a blade as defined above.

BRIEF DESCRIPTION OF THE DRAWINGS

Other characteristics and advantages of the invention appear from the following description of embodiments of the invention, given as nonlimiting examples, and with reference to the accompanying figures, in which.

DETAILED DESCRIPTION OF THE INVENTION

Figure 1:
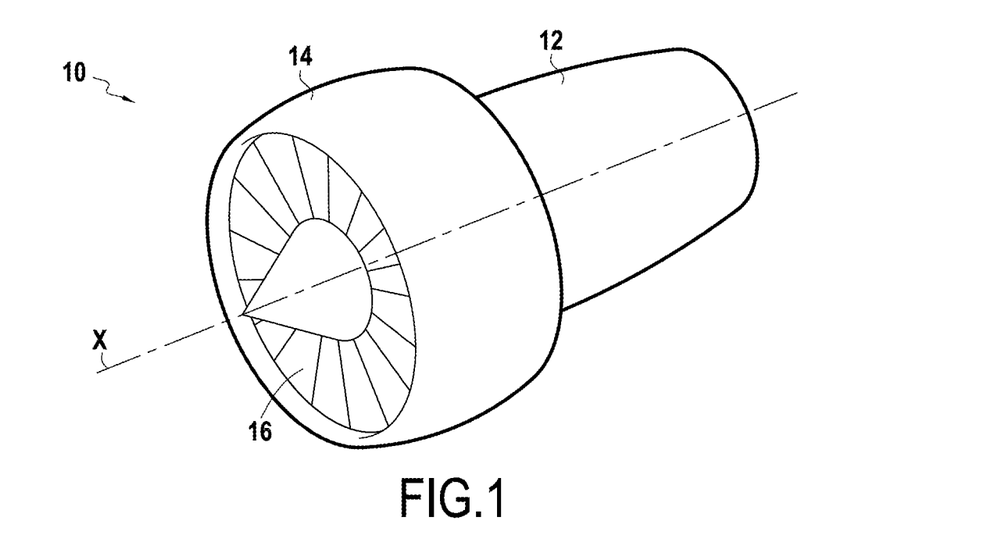
FIG. 1 is a diagrammatic perspective view of a bypass turbojet.
Figure 2:
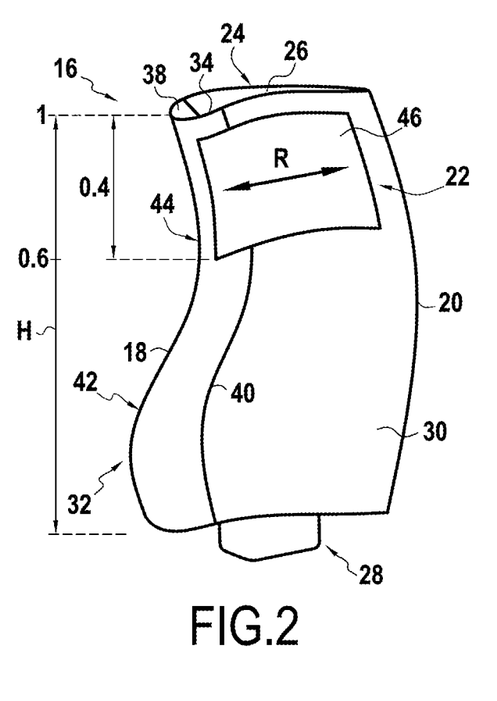
FIG. 2 is a diagrammatic perspective view of the pressure side of a rotary blade of the fan of the FIG. 1 turbojet in a first embodiment of the blade.
Figure 3:
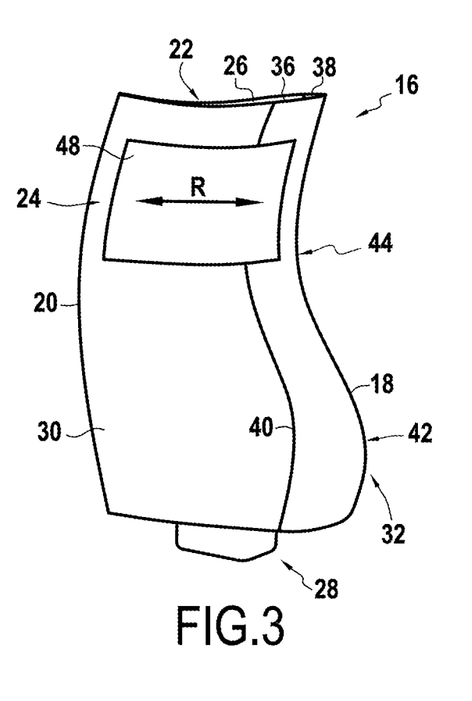
FIG. 3 is a diagrammatic perspective view of the suction side of the FIG. 3 blade.

FIG. 1 shows a bypass turbojet 10 having a gas generator unit 12 and a fan 14. The fan 14 has a plurality of rotary blades 16 that are arranged radially around a central axis X, and that are aerodynamically profiled in such a manner as to impel air by rotating. Thus, as shown in FIGS. 2 and 3, each blade 16 presents a leading edge 18, a trailing edge 20, a pressure side 22, a suction side 24, a blade tip 28, and a blade root 28.

In normal operation, the relative airflow is oriented substantially towards the leading edge 18 of each blade 16. Thus, the leading edge 18 is particularly exposed to impacts. In particular, when the blade 16 has a blade body 30 made of composite material, in particular having a fiber-reinforced polymer matrix, it is appropriate to protect the leading edge 18 with a leading edge shield 32 that is integrated with each blade. In other words, the leading edge shield 32 is assembled on the blade body 30.

The leading edge shield 32 is made out of a material that withstands point impacts better than does the composite material of the blade body 30. The leading edge shield 32 is mainly made of metal, and more specifically out of a titanium-based alloy, such as for example TA6V (Ti-6Al-4V). The leading edge shield 32 may equally well be made of steel or of a metal alloy commonly known by the registered trademark Inconel™. The term "Inconel" is used below to designate an alloy based on iron alloyed with nickel and chromium.

The leading edge shield 32 has a pressure-side fin 34, a suction-side fin 36, and a central section 38 that is thicker, that connects together the pressure-side fin 34 and the suction-side fin 36, and that is to be placed astride an edge of the blade body 30. The pressure-side and suction-side fins 34 and 36 serve to position the shield 32 on the blade body 30. The pressure-side and suction-side fins 34 and 36 present respective free edges 40 and they may be of lengths that are identical, or else one of the fins 34, 36 may be longer than the other.

Furthermore, the shield 32 has a projecting portion 42 and a recessed portion 44. The projecting portion 44 is arranged between the blade tip 26 and the projecting portion 42. It can thus be understood that the projecting portion 42 of the shield 32 is arranged between the recessed portion 44 and the blade root 28. Thus, going from the blade root towards the blade tip, there are encountered in succession: the blade root 28; the projecting portion 42; the recessed portion 44; and the blade tip 26.

In the embodiment of FIGS. 2 and 3, the blade 16 has a first bonding reinforcement 46 adhesively bonded on the pressure side 22, and a second bonding reinforcement 48 adhesively bonded on the suction side 24. Each bonding reinforcement 46, 48 is adhesively bonded both to the blade body 30 and to the leading edge shield 32. Each bonding reinforcement 46, 48 thus covers a portion of each free edge 40 of the leading edge shield 32, respectively on the pressure side 22 and on the suction side 24.

The bonding reinforcement 46 is adhesively bonded on the recessed portion 44 and therefore covers the portion of the free edge 40 of the leading edge shield 32 that is situated in register with this recessed portion 44. In FIG. 2, the bonding reinforcement 46 is adhesively bonded in the proximity of the blade tip 26. It is adhesively bonded in the range 0.6 to 0.95 of the total height H of the blade 16 as measured from the blade root 28.

This extent depends in particular on the forwardly or rearwardly swept offset of the leading edge 18, i.e. on the axial projection of the bulging leading edge 18 having the greatest advance on the side that is upstream relative to the air stream and/or having the greatest setback on the side that is downstream relative to the air stream. The bonding reinforcement 46 is arranged in register with this offset of the leading edge 18.

Figure 4:
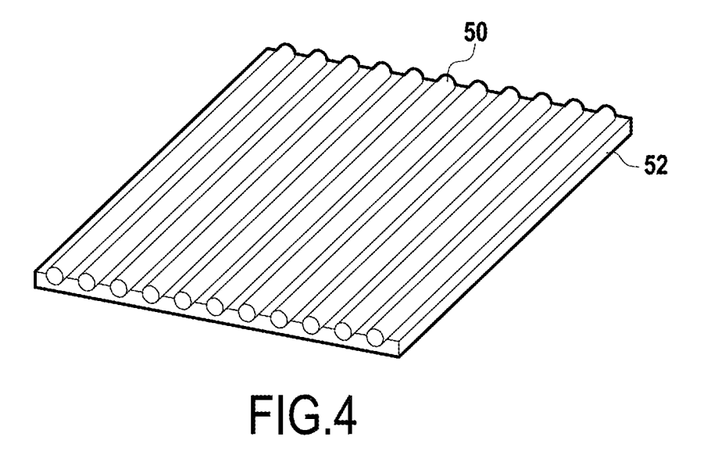
FIGS. 4, 5A, 5B, and 5C are diagrammatic perspective views of bonding reinforcement.

The bonding reinforcements 46, 48 may comprise fibers. For example, as shown in FIG. 4, all of the fibers 50 may be oriented in the same direction, and the fibers are said to be "unidirectional". In this example, the fibers 50 are shown as being partially embedded in a matrix 52 in order to show their orientation. It can be understood that in the bonding reinforcement, the fibers 50 are completely embedded in the matrix 52, and the reinforcement may be said to comprise impregnated plies. In general, the matrix 52 comprises compounds that enable the fibers to be adhesively bonded onto a support, specifically onto the blade 16.

In FIG. 4, the fibers 50 are shown as being in the form of strands of circular cross-section.

Advantageously, the fibers 50 are rectangular in cross section. Thus, the thickness of the bonding reinforcement 46 can be limited, thereby avoiding harming the aerodynamic characteristics of the blade 16. For example, the rectangular cross-section of the strands may present a thickness of 0.1 millimeters (mm) and a width lying in the range 2 mm to 3 mm. The bonding reinforcement is such that it does not create any bulging on the blade, thereby minimizing any need to add aerodynamic finishing layers.

Having fibers of such a thickness, in particular when the blade body 30 comprises 3D weaving, makes it possible to obtain an improved surface state for the blade body 30. The bonding reinforcement 46 makes it possible to attenuate surface undulations of the blade body 30 when it is made out of fiber-reinforced polymer matrix composite material. Thus, such bonding reinforcement 46 serves to improve the aerodynamic characteristics of the blade 16.

The fibers 50 are preferably oriented perpendicularly to the free edge 40 of the leading edge shield 32. Specifically, this direction is represented by double headed arrow R, and is the direction in which the forces tending to tear off the leading edge shield are the greatest.

Figure 5A:
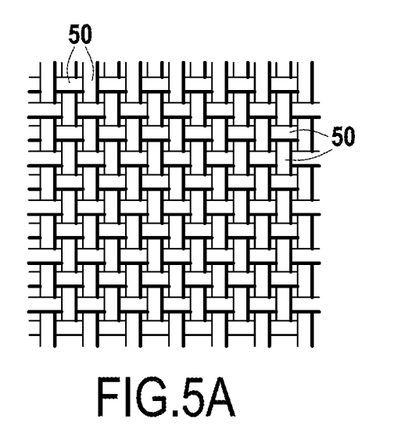
Figure 5B:
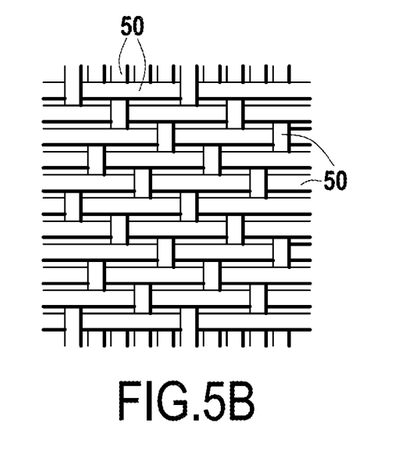
Figure 5C:
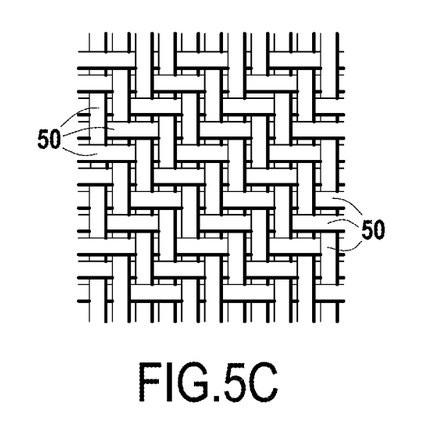

The bonding reinforcement may also comprise woven fibers. FIGS. 5A, 5B, and 5C show various examples of woven fibers. The fibers 50 may be embedded in a matrix, or they may be supplied in the form of sheets or rolls that are not impregnated.

The bonding reinforcement may also comprise non-woven fibers, e.g. fibers 50 distributed in uniform manner within a matrix 52.

Thus, the method of fabricating the blade 16 includes a step of assembling the leading edge shield 32 on the blade body 30, e.g. by adhesive bonding. This step is followed by a step of adhesively bonding the bonding reinforcement 46, 48 on the blade 16. Each bonding reinforcement 46, 48 is adhesively bonded both to the blade body 30 and to the leading edge shield 32.

Typically, when the matrix 52 comprises a thermosetting adhesive, the blade on which the bonding reinforcement is positioned is placed in an autoclave in order to bond the bonding reinforcement onto the blade.

When the fibers are in their non-impregnated form, they are cut to the desired dimensions, placed on the blade 16, and impregnated with adhesive. Thereafter, the blade 16 is subjected to treatment, e.g. a step of heating in an autoclave, in order to bond the bonding reinforcement onto the blade.

The bonding step may be preceded by a step of preparing the touching surfaces, i.e. the surfaces of the blade body 30 and/or of the leading edge shield 32.

Below, elements that are common to the various embodiments are identified by the same numerical references.

Figure 6:
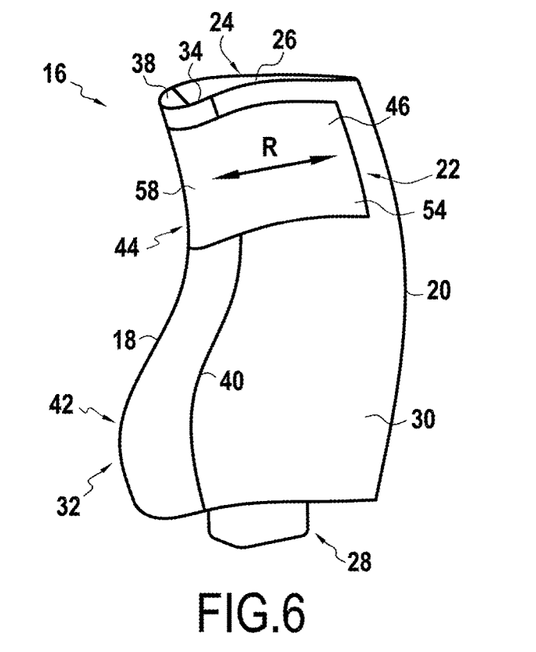
FIGS. 6 and 7 are diagrammatic perspective views respectively of the pressure side and of the suction side of a blade in a second embodiment of the blade.
Figure 7:
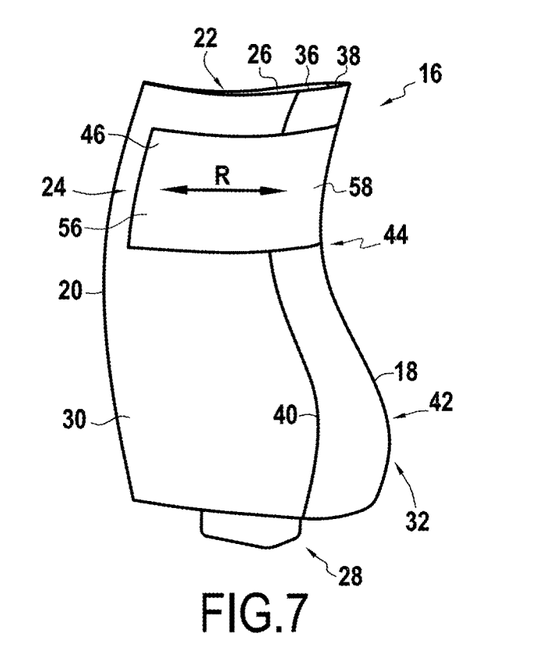

FIGS. 6 and 7 show a second embodiment of the blade 16 in which the bonding reinforcement 46 comprises a first portion 54 bonded on the pressure side 22 and a second portion 56 bonded on the suction side 24. The first and second portions 54 and 56 are connected together by an intermediate portion 58. In FIGS. 6 and 7, the intermediate portion 58 is bonded onto the leading edge shield 32. The bonding reinforcement 46 covers the leading edge shield 32 over the full height of the bonding reinforcement 46.

Figure 8:
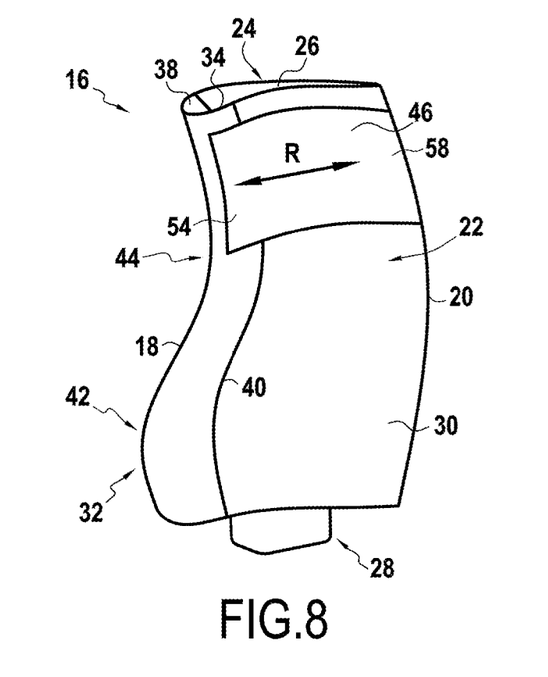
FIGS. 8, 9, and 10 are diagrammatic perspective views of a blade respectively in third, fourth, and fifth embodiments of the blade.

FIG. 8 shows a third embodiment of the blade 16 in which the intermediate portion 58 of the bonding reinforcement 46 is bonded on the trailing edge 20 of the blade 16.

Figure 9:
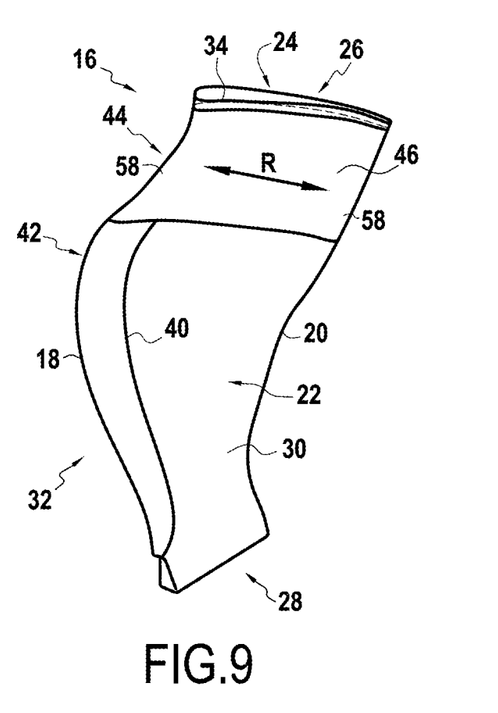

FIG. 9 shows a fourth embodiment of the blade 16 in which the bonding reinforcement 46 as to intermediate portions 58, one bonded on the leading edge shield 32 and the other bonded on the trailing edge 20 of the blade 16. The bonding reinforcement 46 thus covers the entire surface of the blade 46 over the height of the bonding reinforcement 46.

It should be observed that the FIG. 9 blade 16 presents a shape that is different from the blades of the preceding figures. Nevertheless, the blade 16 of FIG. 9 likewise has a projecting portion 42 and a recessed portion 44. The projecting portion 44 is arranged between the blade tip 26 and the projecting portion 42. It can thus be understood that the projecting portion 42 of the shield 32 is arranged between the recessed portion 44 and the blade root 28. Thus, going from the blade root towards the blade tip, there are encountered in succession: the blade root 28; the projecting portion 42; the recessed portion 44; and the blade tip 26.

Figure 10:
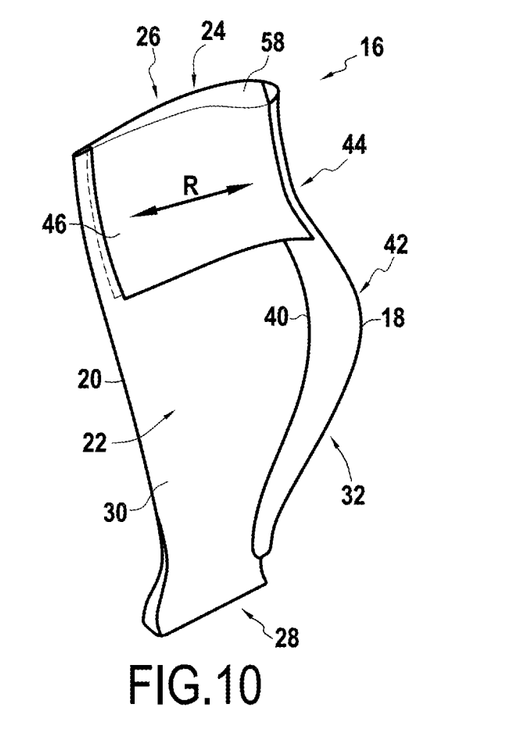

FIG. 10 shows a fifth embodiment of the blade 16, in which the intermediate portion 58 is adhesively bonded onto the blade tip 26. In FIG. 10, the fibers are preferably oriented perpendicularly to the free edge 40 of the leading edge shield 32. Alternatively, the fibers could be oriented preferably perpendicularly to the free edge of the leading edge shield at the blade tip, i.e. the orientation of the fibers of the bonding reinforcement could be parallel to the free edge 40 of the leading edge shield 32.

The blade body 30 may be obtained by injecting a 3D woven preform by resin transfer molding (RTM).

When the leading edge shield 32 is co-molded on the 3D woven preform in the RTM injection mold, the fibers 50 of the bonding reinforcements 46, 48 may be assembled to the remainder of the blade during the RTM injection for impregnating the 3D woven preform.

When the leading edge shield 32 is adhesively bonded onto the blade body 30, the fibers 50 of the bonding reinforcements 46, 48 may be assembled on the blade 16 by impregnating the fibers 50 with polyurethane.

It should be observed that a finishing layer of polyurethane is generally applied to the pressure side of the blade body 30 in order to avoid abrasion and wear of the pressure side. Thus, the step of applying polyurethane, in particular on the pressure side of the blade body 30 is a step that already forms part of the method of fabricating a blade 30 made of fiber-reinforced organic matrix composite material. Furthermore, in the event of a coat of finishing paint being applied to the body of the blade, the bonding reinforcement does not make the method of fabricating the blade any more complex, since it can be covered with such paint, should that be necessary.

Although the present invention is described with reference to specific embodiments, it is clear that various modifications and changes may be undertaken on those embodiments without going beyond the general ambit of the invention as defined by the claims. Thus, individual characteristics of the various embodiments mentioned above may be combined in additional embodiments. Consequently, the description and the drawings should be considered in a sense that is illustrative rather than restrictive.

In particular, the bonding reinforcement may comprise a plurality of layers of fibers stacked one on another, each layer possibly comprising fibers of a composition that is different from that of the other layers, at each layer possibly having a fiber orientation that is different from the other layers. The composition of the bonding reinforcement need not be uniform over its entire surface area. Furthermore, particularly when the blade has a plurality of bonding reinforcements, each bonding reinforcement may be of a shape that is different from the other bonding reinforcement, and/or may comprise fibers of a composition and an orientation that are different from the other bonding reinforcement, and/or may be formed by one or more stacked fiber layers, which layers may comprise fibers of compositions that are different from the other layers, and each layer may have fibers oriented differently from the other layers.

The invention claimed is:

1. A blade comprising:
   a blade body made of organic matrix composite material reinforced by fibers;
   a leading edge shield made of a material that withstands point impacts better than the composite material of the blade body, the leading edge shield being assembled on the blade body; and
   a bonding reinforcement adhesively bonded directly to an outer surface of the leading edge shield and adhesively bonded directly to an outer surface of the blade body, the bonding reinforcement extending only partially over the outer surface of the blade body;
   wherein the bonding reinforcement includes fibers, and the fibers, for the most part, are oriented perpendicularly to a free edge of the leading edge shield.

2. The blade according to claim 1, wherein the blade has a leading edge and a trailing edge, and the leading edge shield has a free edge, the bonding reinforcement including a zone covering the leading edge shield and a zone covering the blade body, the zone covering the leading edge shield presenting a width, as measured perpendicularly to the free edge, that lies in the range 0.5 cm to 1.5 cm.

3. The blade according to claim 1, wherein the blade includes a blade tip and a blade root, the leading edge shield including a projecting portion and a recessed portion, the recessed portion being arranged between the blade tip and the projecting portion, and the bonding reinforcement being positioned within the recessed portion.

4. The blade according to claim 3, wherein the bonding reinforcement is delimited by the recesed portion.

5. The blade according to claim 1, wherein the blade has a suction side, a pressure side, and at least two bonding reinforcements, a first bonding reinforcement being adhesively bonded on the pressure side, and a second bonding reinforcement being adhesively bonded on the suction side.

6. The blade according to claim 1, wherein the blade has a suction side and a pressure side, and wherein the bonding reinforcement comprises a first portion adhesively bonded on the pressure side and a second portion adhesively bonded on the suction side, the first portion and the second portion being connected together by an intermediate portion.

7. The blade according to claim 6, wherein the intermediate portion is adhesively bonded on the leading edge shield.

8. The blade according to claim 6, wherein the intermediate portion is adhesively bonded on a trailing edge of the blade.

9. The blade according to claim 6, wherein the blade includes a blade tip and the intermediate portion is adhesively bonded on the blade tip.

10. A turbojet including a fan having a plurality of blades according to claim 1.

11. A method of fabricating a blade according to claim 1, the method comprising the following steps:
    assembling together the blade body and the leading edge shield; and
    adhesively bonding the bonding reinforcement on the blade.

12. The blade according to claim 1, wherein the material of the leading edge shield includes a metal or a metal alloy.

13. The blade according to claim 1, wherein:
    the bonding reinforcement is adhesively bonded directly to the outer surface of the leading edge shield such that at least a portion of the outer surface of the leading edge shield is exposed.

14. The blade according to claim 13, wherein an extent of an overlap of the bonding reinforcement over the leading edge shield, in a direction extending from a trailing edge of the blade toward a leading edge of the blade, is in a range of 0.5 cm to 1.5 cm.

15. The blade according to claim 13, wherein the outer surface of the leading edge shield includes a leading edge of the leading edge shield.

16. The blade according to claim 15, wherein:
the blade includes a blade tip and a blade root;
the leading edge shield includes a projecting portion and a recessed portion, the recessed portion being arranged between the blade tip and the projecting portion;
the bonding reinforcement extends only partially over the outer surface of the leading edge shield; and
the bonding reinforcement is positioned within and delimited by the recessed portion.

17. The blade according to claim 1, wherein:
a bottom of the bonding reinforcement is spaced apart from a root of the blade by a first distance, the first distance defined by at least 0.6 times the height of the blade.

18. The blade according to claim 1, wherein the fibers are, for the most part, oriented perpendicularly to a free edge of the leading edge shield.

19. The blade according to claim 1, wherein the bonding reinforcement extends only partially over the outer surface of the leading edge shield.

* * * * *